Oct. 17, 1950     W. E. BROWN     2,526,535
COTTON SEPARATOR

Filed July 8, 1947     3 Sheets-Sheet 1

INVENTOR.
William E. Brown
BY Victor J. Evans & Co.
ATTORNEYS

Oct. 17, 1950 W. E. BROWN 2,526,535
COTTON SEPARATOR
Filed July 8, 1947 3 Sheets-Sheet 2
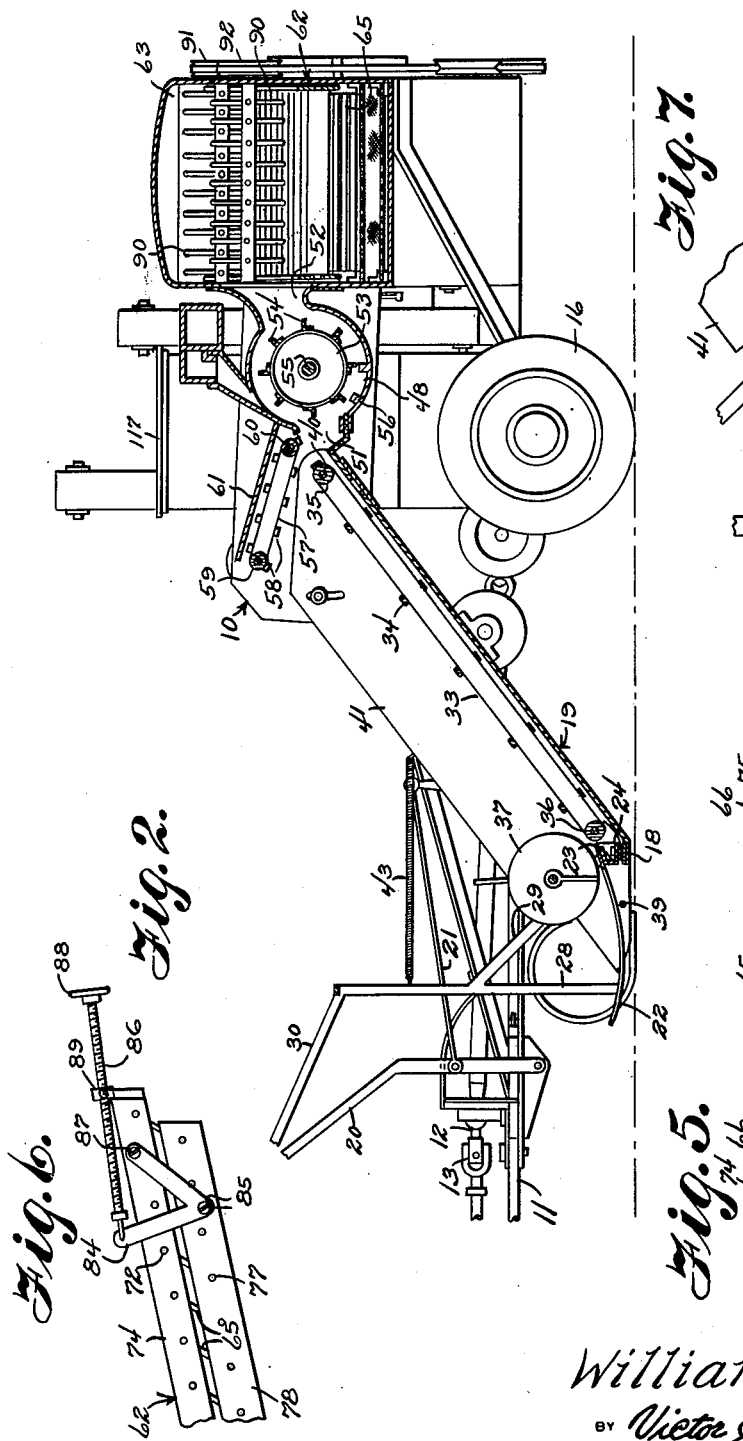
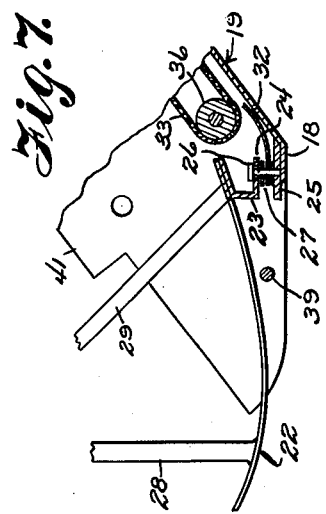
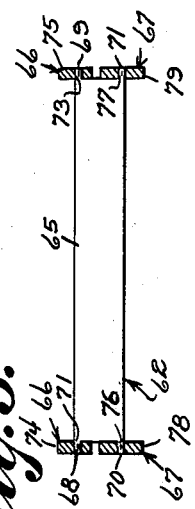
INVENTOR.
William E. Brown
BY Victor J. Evans & Co.
ATTORNEYS Oct. 17, 1950  W. E. BROWN  2,526,535
COTTON SEPARATOR Filed July 8, 1947  3 Sheets-Sheet 3

INVENTOR.
William E. Brown
BY Victor J. Evans & Co.
ATTORNEYS

Patented Oct. 17, 1950

2,526,535

UNITED STATES PATENT OFFICE 2,526,535

COTTON SEPARATOR

William E. Brown, Plainview, Tex.

Application July 8, 1947, Serial No. 759,606

6 Claims. (Cl. 19—38)

1

This invention relates to cotton pickers of the harvester-thresher type, and in particular a harvesting machine having a plurality of spaced horizontally disposed fingers extending at the front for removing the cotton bolls from the stalks, elevating conveyors, a concave for shredding the bolls, means for removing the stalks, trash, and chaff, and means for ejecting the cleaned bolls at an elevated position from which they may be deposited upon a wagon or the like.

The purpose of this invention is to provide means for converting a combination harvester-thresher into a cotton picking machine.

Various types of machines have been provided for picking cotton, but it has been found that the most efficient device for harvesting cotton is the usual harvester-thresher with the cutter blade replaced with outwardly extending prongs and with the operation of the machine reversed wherein the chaff and stalks are deposited on the ground through the grain conveyor, and the cotton is blown from the upper part instead of the chaff.

The object of this invention is to provide a machine for picking cotton, removing the stalks, trash, and chaff from the bolls, and cleaning the bolls.

Another object of the invention is to provide a cotton picking machine that bends the stalks over to facilitate removing the bolls therefrom.

Another object of the invention is to provide a machine for removing cotton bolls from stalks which takes a very small percentage of the stalk, and removes the boll without cutting the stalk.

Another object of the invention is to provide a cotton picking attachment for harvesting machines that may readily be elevated to compensate for cotton of different heighths.

Another object of the invention is to provide a rack for cotton picking machines which is provided with vertically disposed slats over which the bolls travel in which the inclination of the slats may be adjusted.

A further object of the invention is to provide an improved cotton picking harvester which is of a comparatively simple and economical construction.

With these and other objects in view the invention embodies a combination harvester-thresher with cotton picking prongs that are interchangeable with the cutter of the harvester, a bar positioned below the prongs for bending the cotton stalks over as the bolls are removed therefrom, conveyors for elevating and feeding the cotton, a concave, a rack, means for reciprocating the rack, and means for blowing the cleaned cotton bolls from the upper part of the machine.

For other objects and for a better understanding of the invention reference may be had to the following description taken in connection with the accompanying drawings, in which Figure 1 is a plan view with parts broken away illustrating the improved cotton picking and separating elements of the machine.

Figure 2 is a longitudinal section through the machine taken on line 2—2 of Figure 1 illustrating the relative positions of the cotton picking prongs, conveyor, concave, and rack.

Figure 5 is a detail showing a section through the rack taken on line 5—5 of Figure 4.

Figure 6 is a detail showing a crank and an adjusting screw for adjusting the inclination of the slats of the rack, said parts being shown on an enlarged scale.

Figure 7 is a detail showing a section through the cotton picking prong mounting means illustrating the removable connection wherein the prongs are interchangeable with a cutting blade of the harvester.

Figure 1:
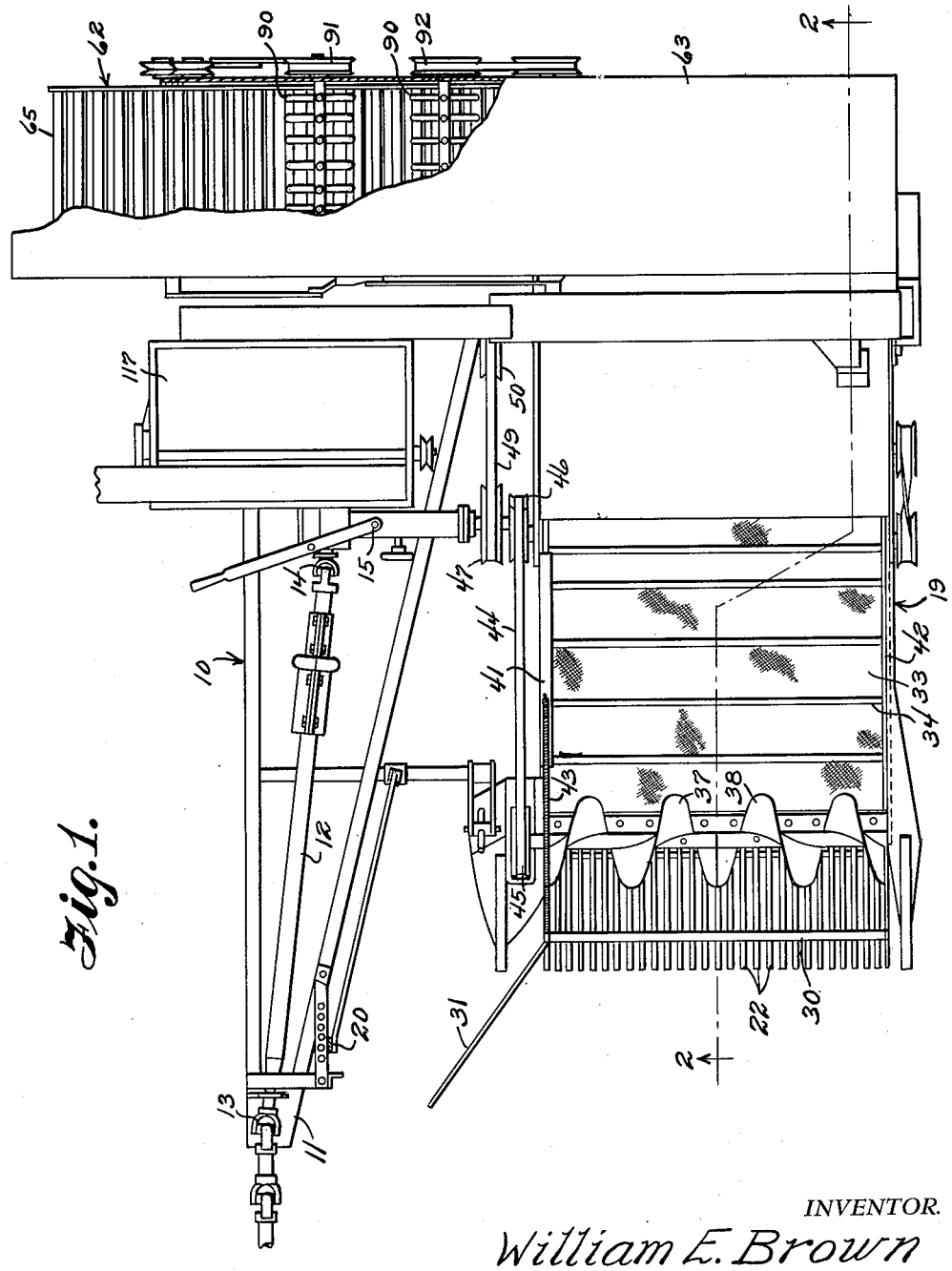

Referring now to the drawings wherein like reference characters indicate corresponding parts the combination harvester and thresher of this invention, as indicated by the numeral 10, is provided with a tongue 11 by which the machine may be attached to a tractor or the like, and a drive shaft 12, with universal joints 13 and 14 therein is journaled in the tongue so that the forward end may be connected to the power take-off shaft of the tractor and the opposite end connected to a transmission case 15 through which the different elements of the machine may be actuated.

The machine is supported on wheels 16 through an axle 17, and with the tongue 11 connected to a tractor the forward end 18 of an inclined platform 19 is positioned relatively close to the ground, and the elevation thereof may be adjusted by a lever 20 through a rod 21 as shown in Figure 2. Spaced arcuate horizontally disposed cotton picking prongs 22 are mounted on the lower end 18 of the platform 19 as illustrated in Figure 7 with the prongs attached to a channel shaped member 23. The lower flange 24 of the member 23 is attached to a plate 25 through bolts 26 and spacing washers 27 are placed on the bolts between the flange and plate providing a loose connection through which the outer ends of the prongs may be raised and lowered by bars 28, 29, and 30, that may be actuated from the driver's seat of a tractor to which the machine may be connected through a rod 31. Springs 32 are also provided on the bolts to resiliently urge the prongs downward, thereby providing means permitting the prongs to spring upward when they engage rocks and the like. With the prongs mounted on the end 18 in this manner they may readily be removed so that the usual cutter bar may be mounted thereon when it is desired to use the machine for grain and the like.

An endless belt providing an apron conveyor 33 with slats 34 thereon is provided on the platform 19 with the upper end traveling over a pulley 35, and the lower end over a pulley 36. The lower end of the conveyor is positioned to receive cotton bolls from the prongs 22 and a screw with oppositely disposed sections 37 and 38 facilitates feeding the bolls to the conveyor. With the screw having right and left hand sections the bolls are fed toward the center of the conveyor. A transversely disposed rod 39 is also provided below the prongs which engages the cotton stalks, bending the stalks forward slightly as they are raked by the prongs, thereby facilitating removing the bolls therefrom. The pulley 35 at the upper end of the conveyor is mounted on a shaft 40 which extends through the sides 41 and 42 of the platform 19 providing a pivot therefor, and a spring 43 is provided between the rod 28 and side 41 to resiliently hold the prongs.

The feed screw formed by the sections 37 and 38 is driven from the transmission 15 by a belt 44 on pulleys 45 and 46, and a pulley 47 on the shaft with the pulley 46 drives a concave 48 that is positioned to receive the cotton bolls and trash from the conveyor 33, through a belt 49 and pulley 50. The concave 48 is formed in a cylindrical housing with an inlet opening 51 in the forward side and an outlet opening 52 in the opposite side. A rotor 53 with radially extending bars 54 on the periphery is rotatably mounted in the concave on a shaft 55 on which the pulley 50 is mounted, and with the bars 54 coacting with the inner surface of the concave and also with lugs 56 therein the bolls and stalks will be broken up thereby. A small feeder apron 57 with slats 58 thereon is positioned to feed the bolls and stalks from the upper end of the conveyor 33 into the concave. The apron 57 is mounted on pulleys 59 and 60, and is provided with a cover plate 61.

Figure 3:
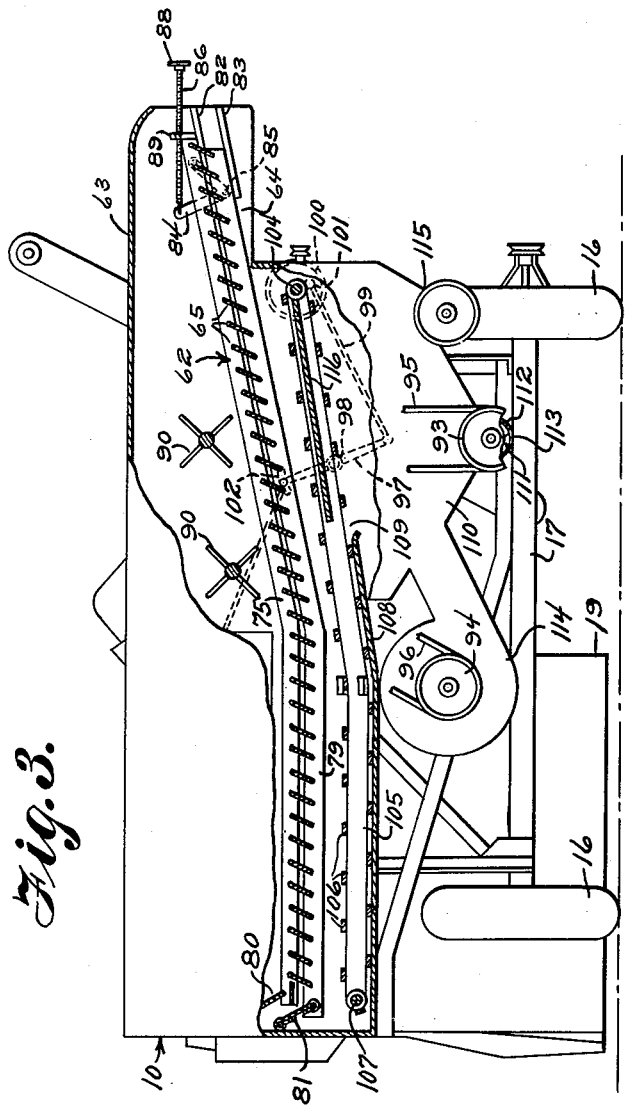
Figure 3 is an end elevational view looking toward the rear of the machine with parts broken away showing the rack and refuse conveyor.
Figure 4:
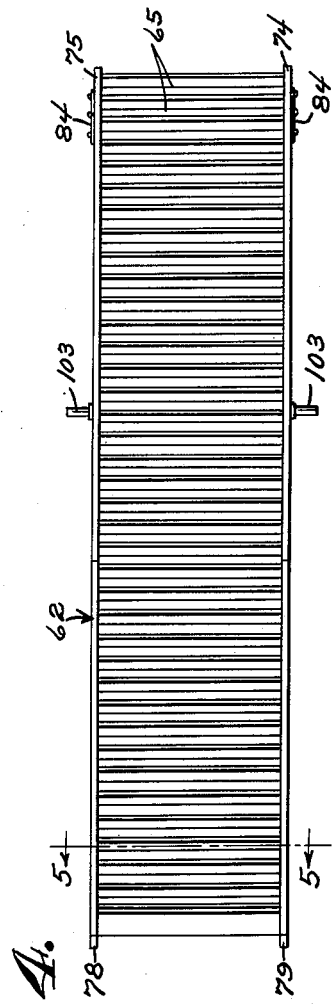
Figure 4 is a plan view of the separating and conveying rack with other parts of the machine omitted.

The rotor 53 of the concave feeds the cotton bolls, stalks, and chaff through the outlet opening 52 from which they are deposited on the rack 62 in a separator chamber 63 in which the bolls are separated from the chaff and worked along the rack until they drop through an opening 64 that may project over a wagon or the like. The rack is formed with inclined slats 65 pivotally mounted between two frames 66 and 67, as shown in Figures 3 and 4, the slats being provided with pins 68, 69, 70 and 71 at the ends which are pivotally held in openings 72 and 73 in side beams 74 and 75 of the upper frame 66 and 76 and 77 in side beams 78 and 79 of the lower frame 67, as shown in Figure 5. The frames of the rack are suspended at their inner ends by links 80 and 81, and the opposite ends rest on bars 82 and 83 on the sides of the separator housing. A bell crank 84 is pivotally mounted on the side beam 78 of the lower frame on a bolt 85, and one arm is pivotally connected to the beam 74 of the upper frame, wherein with a screw 86 connected to the other arm the relative positions of the frames may readily be adjusted to change the angle of inclination of the slats. The arm is pivotally connected to the upper frame 66 at the point 87 and the screw which has a head 88 is threaded in a lug 89 as shown in Figure 6.

The separator chamber 63 is provided with a plurality of rotating members or impellers 90 with radially extending blades and although only two of these members are shown it will be understood that as many as may be desired may be used. The members 90 are provided with pulleys 91 and 92 by which they are rotated from pulleys 93 and 94 in a counterclockwise direction by belts 95 and 96 as shown in Figures 1 and 3. The rack is continuously reciprocated during the operation of the machine by a lever 97 pivotally mounted on a pin 98 and actuated by a bar 99 eccentrically connected to a pulley 100 at the point 101, as shown in Figure 3. The lever is adjustably attached to the rack with the end thereof clamped in a slot 102 by a bolt 103, so that the reciprocating movement may be regulated. The pulley 100 is mounted on a shaft 104 of a scraper conveyor having chains 105 with bars 106, that is positioned below the rack so that it will receive stalks, trash, and chaff that drop through the rack. The opposite end of the conveyor is held on a shaft 107 and the refuse is scraped along a tray 108 until it drops through an opening 109 into a bin 110 from which it is deposited upon the ground directly or through a screw conveyor 111. The housing 112 of the screw conveyor 111 may be provided with openings 113 to permit the waste to drop to the ground. The bin 110 may be provided with a blower 114 to separate lighter particles such as leaves from the stalks and these may be blown over to another screw conveyor in a section 115. The air from the blower will also pass upward through the rack to facilitate cleaning the bolls and at the same time will exhaust the bolls. The scraper conveyor may be provided with a horizontally disposed partition 116 if desired.

With the parts assembled as disclosed the bolls will be stripped from the cotton plants as the machine passes over the field, and these with small particles of the stalks will be deposited on the conveyor 33 from which they are fed to the concave 48 and from the concave they are deposited upon the rack over which they are worked with the stalks, trash, and chaff dropping through the slats 65, and with the cleaned bolls dropping from the projecting end of the rack upon a wagon or the like. The angle of inclination of the slats may be adjusted to expedite cleaning or they may be straightened to clean the rack.

The cotton picker and harvester of this invention may be made as a separate and independent unit or may be formed with a harvester-thresher by removing the cutter and mounting the cotton stripping prongs at the lower end of the elevating conveyor as shown and described. The right and left hand feeding screw may also be added to feed the cotton bolls toward the center of the conveyor, and the bend rod 39 may be used in combination with the prongs to bend the cotton plants or stalks over to facilitate stripping the bolls herefrom. The grain bin 117 with the elevators and conveyors associated therewith may or may not be used as may be desired.

It will be understood that other modifications may be made in the design and arrangement of the parts without departing from the spirit of the invention.

What is claimed is:

1. A cotton boll separator comprising a horizontally disposed rack having upper and lower frames and with portions of the frames inclined upwardly, spaced transversely disposed parallel slats positioned in said rack with the upper edges pivotally mounted in the upper frame and the lower edges pivotally mounted in the lower frame, means reciprocating the rack, means feeding cotton bolls to the horizontally disposed portion of the rack, a housing substantially enclosing the rack, and means circulating air through the rack.

2. A cotton boll separator comprising a horizontally disposed rack having upper and lower frames and with portions of the frames inclined upwardly, spaced transversely disposed parallel slats positioned in said rack with the upper edges pivotally mounted in the upper frame and the lower edges pivotally mounted in the lower frame, means reciprocating the rack, means feeding cotton bolls to the horizontally disposed portion of the rack, means for adjusting the angle of inclination of the slats of the rack, a housing substantially enclosing the rack, and means circulating air through the rack.

3. A cotton boll separator comprising a horizontally disposed rack having upper and lower frames and with portions of the frames inclined upwardly, spaced transversely disposed parallel slats positioned in said rack with the upper edges pivotally mounted in the upper frame and the lower edges pivotally mounted in the lower frame, means reciprocating the rack, means feeding cotton bolls to the horizontally disposed portion of the rack, impelling means influencing cotton bolls along the rack, a housing substantially enclosing the rack, and means circulating air through the rack.

4. A cotton boll separator comprising a horizontally disposed rack having upper and lower frames and with portions of the frames inclined upwardly, spaced transversely disposed parallel slats positioned in said rack with the upper edges pivotally mounted in the upper frame and the lower edges pivotally mounted in the lower frame, means reciprocating the rack, means feeding cotton bolls to the horizontally disposed portion of the rack, pivotally mounted links suspending the ends of the frames at one end of the rack, means slidably supporting the ends of the frames at the opposite ends of the rack, a housing substantially enclosing the rack, and means circulating air through the racks.

5. A cotton boll separator comprising a horizontally disposed rack having upper and lower frames and with portions of the frames inclined upwardly, spaced transversely disposed parallel slats positioned in said rack with the upper edges pivotally mounted in the upper frame and the lower edges pivotally mounted in the lower frame, means reciprocating the rack, means feeding cotton bolls to the horizontally disposed portion of the rack, a substantially horizontally disposed conveyor positioned below the rack, transverse discharge conveyors positioned below the said horizontally disposed conveyor, a housing substantially enclosing the rack, and means circulating air through the rack.

6. A separator for a cotton threshing machine comprising a lower horizontally disposed frame with an upwardly inclined section, a correspondingly shaped upper frame superimposed above the lower frame and spaced therefrom, transverse parallel vertically disposed slats positioned in the frames, means pivotally mounting the upper edges of the slats in the superimposed frame, means pivotally mounting the lower edges of the slats in the lower horizontally disposed frame, means for adjusting the angle of inclination of the slats, means suspending the ends of the frames at one end of the separator for swinging reciprocating action, means slidably mounting the ends of the frames at the opposite end of the separator, rotating impellers positioned above the frames for influencing cotton bolls over the slats, a substantially horizontally disposed conveyor positioned below the frames, said slats being positioned whereby refuse drops through the slats by gravity, means receiving and removing materials passing through the slats, and means circulating air through the slats.

WILLIAM E. BROWN.

REFERENCES CITED

The following references are of record in the file of this patent:

UNITED STATES PATENTS

| Number | Name | Date |
| --- | --- | --- |
| 765,874 | Blain | July 26, 1904 |
| 856,421 | Patterson | June 11, 1907 |
| 1,100,759 | Meurling | June 23, 1914 |
| 1,170,389 | Armstrong | Feb. 1, 1916 |
| 1,372,282 | De Brandt | Mar. 22, 1921 |
| 1,689,443 | MacGregor | Oct. 30, 1928 |
| 1,870,039 | Conrad | Aug. 2, 1932 |
| 1,995,266 | Moss | Mar. 19, 1935 |
| 2,262,453 | Dray | Nov. 11, 1941 |